(No Model.)

J. M. RILEY.
JOURNAL BOX FOR GRINDING AND POLISHING LATHES.

No. 271,519. Patented Jan. 30, 1883.

Witnesses.
A. A. Connolly
J. C. Wildman

Inventor
John M. Riley
by Connolly Bro
atty

UNITED STATES PATENT OFFICE.

JOHN M. RILEY, OF NEWARK, NEW JERSEY.

JOURNAL-BOX FOR GRINDING AND POLISHING LATHES.

SPECIFICATION forming part of Letters Patent No. 271,519, dated January 30, 1883.

Application filed September 23, 1882. (No model.)

*To all whom it may concern:*

Be it known that I, JOHN M. RILEY, a citizen of the United States, residing at Newark, in the county of Essex and State of New Jersey, have invented a certain new and useful Improvement in Journal-Boxes for Grinding and Polishing Lathes; and I do hereby declare the following to be a full, clear, and exact description of the invention, reference being had to the accompanying drawings, which form part of this specification, in which—

Figure 1:
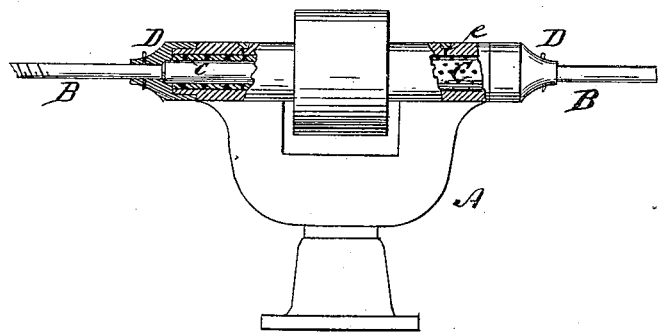
Figure 2:
Figure 3:
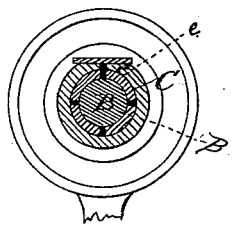

Figure 1 is a side elevation of a lathe, portions of the journal-box and collar being shown in section. Fig. 2 is a side elevation of the lubricating-collar. Fig. 3 is a transverse sectional view through the journal-box, collar, and spindle.

This invention has relation to an improvement in grinding, sanding, and polishing lathes, and has for its object the provision of means whereby the friction and consequent wear on the spindle and bearings are reduced to a minimum, the parts caused to run with greater ease and uniformity, and a saving in lubricating material effected to a remarkable extent.

The improvement consists in the provision of an anti-friction collar which is placed within the spindle box or bearing, and which embraces the spindle. This collar is loosely arranged, so as to allow it such freedom of motion that it may turn easily within the box and allow the spindle to turn freely within the collar, while at the same time the parts mentioned are close enough to insure true motion without lateral play or vibration. As stated, the spindle turns within the collar, the latter being designed to take the place of a lubricant and serve the purpose of reducing or obviating friction. The use of oil is therefore unnecessary—that is, the spindle will turn freely without oil; but the use of a small supply of oil may be sometimes found desirable. The collar may therefore be perforated, as shown, so that should oil be used it will be supplied to the surface of the spindle. With a collar of the kind described there can be no binding, and consequently no friction or wear. The spindle revolves independently of the collar under all ordinary conditions. Should any binding or adherence of the spindle to the collar occur, the collar immediately begins to turn within the box or bearing. A similar binding of the collar to the box, such as will eventually take place, will release the collar from the spindle and allow the spindle to turn without the collar, as before. Hence, as will be seen, there is a constant tendency of the collar to relieve the surfaces, which without it would be in rubbing contact, and to virtually prevent any friction or rubbing whatever. A lathe provided with the collar will run for years without any noticeable change in the surfaces of the spindle or box, and without heating of the metal.

In the accompanying drawings, A represents the head or bracket of a sanding, grinding, or polishing lathe. B is the spindle; C, the anti-friction collar, which, as applied, constitutes my improvement. Usually the spindle-bearing is a sectional box. The cap or upper portion is removable. For the purposes of my invention I construct the bearing solid, as shown, and bore the same for the reception of the collar and spindle.

I do not claim a solid box as absolutely necessary, but as preferable, as my collar can be used in a sectional box also.

The collar is a continuous tube or cylinder, of a diameter to just nicely fit in the space between the spindle or shaft and the inner surface of the bearing, the bore of the latter being larger in diameter than the spindle.

When in place the collar is covered and protected by a cap, D, which fits over the outer end of the box and prevents the access of dust or other particles. The cap, however, may be dispensed with, but not advantageously; yet I do not wish my invention to be regarded as limited to the use of the collar with a cap.

The collar is intended to serve the purpose of a lubricant, and, as already mentioned, does not require oiling. It is, however, perforated at $d$, so that some oil may be used. The oil is supplied to the box through the hole $e$, and finds access to the spindle through the perforations. The collar should be made of a material having little or no ductility, in order that it may not become enlarged from use and bind within the box.

What I claim as my invention is—

1. In a grinding, polishing, or sanding lathe, the continuous cylindrical collar, in combination with the spindle and box or bearing, substantially as set forth.

2. The continuous cylindrical collar, in combination with the spindle and bearing of a grinding, polishing, or sanding lathe and the protecting-cap, substantially as set forth.

In testimony that I claim the foregoing I have hereunto set my hand this 11th day of September, 1882.

JOHN M. RILEY.

Witnesses:
E. W. PROVOST,
BENJ. S. MOREHOUSE.